United States Patent [19]

Rohr

[11] Patent Number: 4,864,295
[45] Date of Patent: Sep. 5, 1989

[54] CAPACITANCE SENSING SYSTEM USING MULTIPLE CAPACITANCES TO SENSE ROTARY MOTION

[75] Inventor: Bruce E. Rohr, Canton, Mass.

[73] Assignee: Cambridge Technology, Inc., Watertown, Mass.

[21] Appl. No.: 212,862

[22] Filed: Jun. 30, 1988

[51] Int. Cl.⁴ .................. G08C 19/10; G08C 19/16
[52] U.S. Cl. .................. 340/870.37; 324/61 R; 341/15
[58] Field of Search ............ 340/870.37; 341/15; 324/61 R

[56] References Cited

U.S. PATENT DOCUMENTS

| | | |
|---|---|---|
| 3,238,523 | 3/1966 | Masel et al. ............ 341/15 |
| 3,421,371 | 1/1969 | Williams, Jr. ............ 340/870.37 |
| 3,732,553 | 5/1973 | Hardway, Jr. ............ 340/870.37 |
| 4,238,781 | 12/1980 | Vercellotti et al. ............ 340/870.37 |

Primary Examiner—Reinhard J. Eisenzopf
Assistant Examiner—Anthony L. Miele
Attorney, Agent, or Firm—George W. Neuner; Robert F. O'Connell

[57] ABSTRACT

A capacitance sensing system for sensing the rotary position of a rotating shaft, particularly one having limited rotary motion. The system uses at least four capacitances comprising fixed capacitance plate members, one of which is preferably made of four arcuate segments enclosing the shaft and the other of which is a ring member enclosing the shaft and displaced therefrom along the shaft. A dielectric member is attached to the shaft between the fixed plate members. The capacitance value of the four capacitances change as the shaft rotates in such a manner that the capacitance changes produce an output voltage which represents the rotary position of the shaft, which output voltage is insensitive to radial motions of the shaft.

9 Claims, 2 Drawing Sheets

CAPACITANCE SENSING SYSTEM USING MULTIPLE CAPACITANCES TO SENSE ROTARY MOTION

INTRODUCTION

This invention relates generally to techniques for determining the angular position of a moving element and, more particularly, to the use of capacitor sensing techniques for determining the angular position of a rotating element, such as a motor shaft.

BACKGROUND OF THE INVENTION

Precision measurements of the rotary position of a rotating element, such as a shaft in a limited rotation motor, are often required as, for example, when using a rotating element to control the angular position of a laser light source. Several different approaches have been proposed to do so, although most techniques have been found for one reason or another to be unsatisfactory when attempting to provide relatively high precision operation.

For example, techniques using variable differential transformers have been found deficient because of their excessive sensitivity to the presence of magnetic fields. Variable potentiometers have been found to have excessive mechanical hysteresis characteristics and, particularly when used around the balanced, or zero, region of the angular position, are subject to oscillation or jitter, which has resulted in contact wear problems. Moreover, potentiometers tend to be subject to general problems of limited life due to their mechanical motions.

Position detectors based on the use of light detection techniques suffer from problems of temperature instability, e.g., drifts, with time. Moreover, such light detection devices can be vibration sensitive and often produce substantially nonlinear operations, even over relatively small ranges of rotary motion of interest. Other optical devices using optical encoder techniques tend to have high mechanical inertia, poor resolution and are relatively expensive to manufacture.

Because of such problems, the art has generally turned to the use of capacitive sensing techniques. Such capacitive devivces can be fabricated to provide relatively high resolution with low noise characteristics and are also relatively insensitive to magnetic fields. Furthermore, capacitive sensors have relatively low rotary inertia, have no mechanical hysteresis, suffer substantially no wear problems, and can be manufactured at relatively low cost.

In currently used capacitive sensing devices, changes in capacitance are sensed as a result of the relative motion of metal plates forming the capacitance element, such capacitors normally using air as the dielectric medium. Such devices normally have one plate electrically grounded, which has sometimes made their use more difficult in many motor shaft applications. Moreover, such devices tend to be relatively sensitive to undesired radial motions of the rotating shaft itself, so that their accuracy is adversely affected in high precision measuring applications. Further, current capacitor sensor devices have less than desirable temperature stability, tending to drift with temperature changes. While the linearity characteristics thereof, which generally provide nonlinearities as low as 0.10%, for example, may be satisfactory for many applications, it is desirable that such linearity be improved by a least an order of magnitude for many high precision measurement applications.

BRIEF SUMMARY OF THE INVENTION

In accordance with a preferred embodiment of the invention, a detection device utilizes a capacitance sensor structure comprising stationary capacitor plate members, preferably formed as a plurality of segmented capacitor plate elements, which enclose the rotating shaft, and a ring-shaped capacitive plate member which also encloses the rotating shaft and is displaced along the length of the shaft from the segmented plate member. A dielectric member, having at least a pair of oppositely disposed arms, is fixedly mounted on the rotating shaft between the capacitor plate members so that the capacitance structure thereby effectively provides a pair of capacitances having capacitance values Ca and Cb which vary in opposite directions as the shaft, and the dielectric member attached thereto, rotates. Circuitry including such capacitances is used to determine the capacitance difference, i.e., (Ca - Cb), so as to produce an output signal which represents the angular position of the rotating shaft.

Such a capacitance sensing structure produces linearities substantially better than those of previous capacitance sensor devices and the capacitors of the structure which form the capacitances Ca and Cb are arranged so that the device is essentially insensitive to radial motions of the rotary shaft. Moreover, such structure can be made relatively insensitive to temperate changes, any drifts caused thereby being capable of being readily compensated for.

DESCRIPTION OF THE INVENTION

The invention can be described in more detail with the help of the accompanying drawing wherein FIGS. 1 and 1A show an exploded view and a side view, respectively, of a particular embodiment of the invention;

Figure 1:
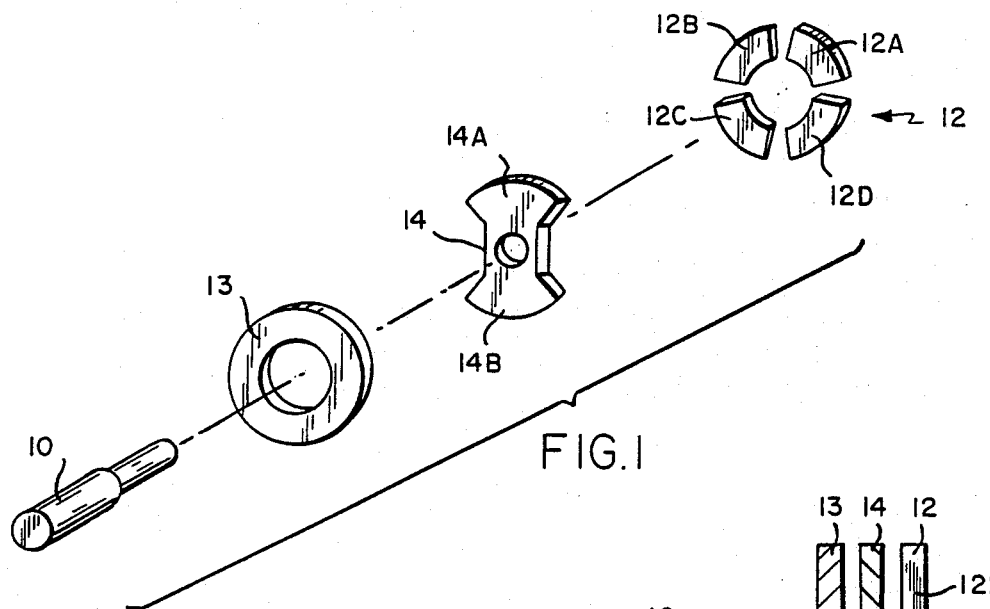
Figure 1A:
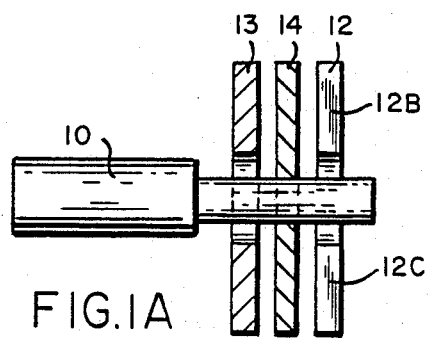
Figure 2:
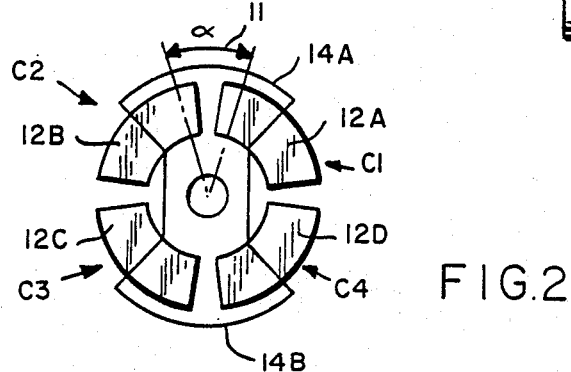
FIG. 2 shows a simplified diagrammatic view of portions of the embodiment of FIGS. 1 and 1A.

As can be seen in FIGS. 1, 1A and 2, in a preferred embodiment a depicted therein, a shaft 10 is arranged to have a limited rotation over the limited rotation angle α, as shown in FIG. 2. A capacitance device comprises stationary capacitance plate members which include a segmented metal plate member 12, made of four metal plate segments 12A, 12B, 12C, 12D, effectively spaced at 90° from each other, as shown, and enclosing shaft 10 which is free to rotate with respect thereto. A metal ring plate member 13 also encloses shaft 10 and is displaced from segmented member 12 along the length of the shaft 20. Such members, for example, can be formed on printed circuit boards which are fixedly mounted in an appropriate manner so as to have the shaft pass through the openings thereof.

A dielectric member 14 is fixedly attached to shaft 10 and is positioned between plate members 12 and 13, member 14 having a substantially bufferfly shape, as shown, comprising two oppositely disposed arms, or wings, 14A and 14B. The physical relationship of the arms of member 14 and the arcuate segmented element 12 is shown in the simplified diagram depicted in FIG. 2. The plate segments 12A and 12C, the corresponding oppositely disposed portions of ring member 13 (not shown in FIG. 2), and the corresponding portions of the dielectric arms 14A and 14B and the air therebetween form capacitances C1 and C3, respectively. In the same manner, segments 12B and 12D, the corresponding portions of ring member 13, and the corresponding portions of dielectric art 14B, and the air therebetween form capacitances C2 and C4, respectively.

Figure 3:
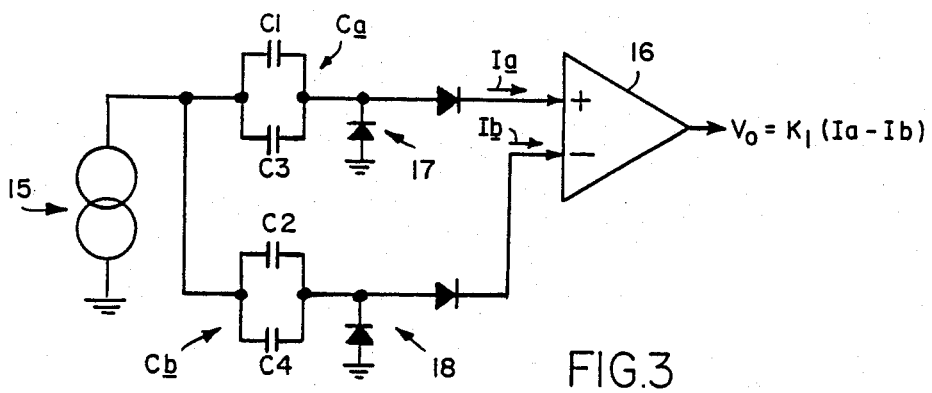
FIG. 3 shows a diagram of measurement circuitry in accordance with an embodiment of the invention.

FIG. 3 depicts a diagram of a measurement circuit which includes parallel-connected pairs of the capacitances C1, C3 (providing a capacitance Ca=C130 C3) and C2, C4 (providing a capacitance Cb=C2+C4). Such capacitances are driven by a suitable AC source 15, and a measurement circuit responsive to the currents Ia and Ib through capacitances Ca and Cb, respectively, provides an output voltage $V_O$, representing the shaft position, where $V_O = k_1$ (Ia - Ib). The measurement circuit in the particular embodiment shown includes a suitable differential current-to-voltage converter amplifier 16, well known to those in the art. Diode pairs 17 and 18 are utilized to demodulate the AC current through capacitances Ca and Cb to produce DC currents at the inputs to the converter amplifier 16.

When the shaft position is at its center, or zero, position angle, as shown, for example, by the position depicted in FIG. 2, the currents Ia and Ib are essentially equal. As the shaft rotates in one direction or the other over angle α, the value of capacitances Ca and Cb change in opposite directions and the capacitance unbalance produces a difference in the currents Ia and Ib which difference is a measurement of the rotation angle of the shaft as it rotates from the zero positions. Accordingly, the output voltage produced by the differential converter amplifier 16 provides a precise measurement of the angular position of the shaft over the limited angular rotations range α.

Because capacitance Ca is equal to C1+C3 and the capacitance Cb is equal to C2+C4, if the shaft tends to move in its bearings in a radial direction, the values of capacitances C1 and C3 change in opposite directions and the values of capacitances C2 and C4 also change in opposite directions, so that the overall capacitances Ca and Cb remain constant. Accordingly, radial motions of the shaft do not affect the rotational measurement thereof. In addition, the system would also be insensitive to axial motion of the shaft. It has been found that by carefully fabricating the configuration of the dielectric member and other mechanical components, nonlinearities can be held to 0.05%, or better. Moreover, it is further possible to empirically trim the plate members of a particular structure in such a way as to further improve the linearity characteristics and achieve non-linearities of as low as 0.005%, or better.

Figure 4:
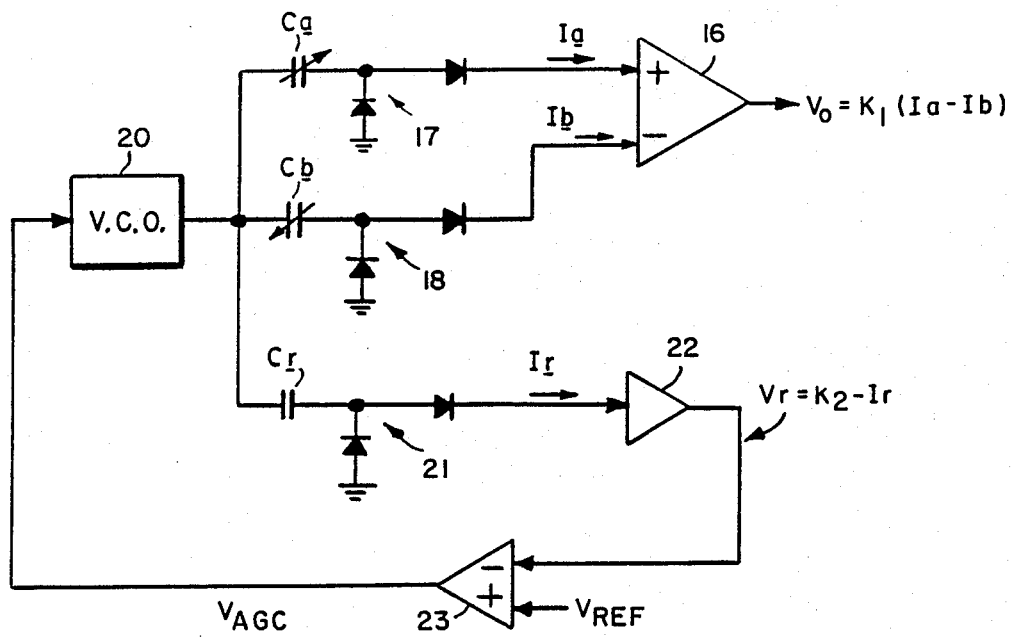
FIG. 4 shows a diagram of measurement circuitry which is a modification of the circuitry of FIG. 3.

In order to compensate for any drifts due to temperature changes, the circuitry for FIG. 3 can be readily modified to provide for such compensation. It is found that the primary problems due to drift tend to arise because of changes occurring in the oscillator circuit. Such problems can be overcome, as shown in FIG. 4, by using an oscillator which is a voltage controlled oscillator (VCO) 20, the amplitude of the output oscillator voltage being controlled by a control voltage input thereto, as is well known to those in the art. In such a configuration a further capacitance, identified in the circuit as capacitance Cr, is also driven by the oscillator to produce a current IR, which is demodulated by a diode pair 21 and supplied to a current-to-voltage converter amplified 22 to produce a voltage $V_r = k_2 I_r$. Such voltage is then compared to a reference voltage, $V_{ref}$, at voltage comparator amplifier 23, to produce an automatic gain control (AGC) voltage output $V_{AGC}$ used as the control input voltage for controlling VCO 20. If the output from the oscillator drifts due to temperature changes from the desired value represented by $V_{ref}$, the AGC circuit depicted in FIG. 4 will cause the AGC control voltage to the oscillator to vary in the appropriate direction so as to maintain the output voltage from the oscillator at the desired value.

Figure 5:
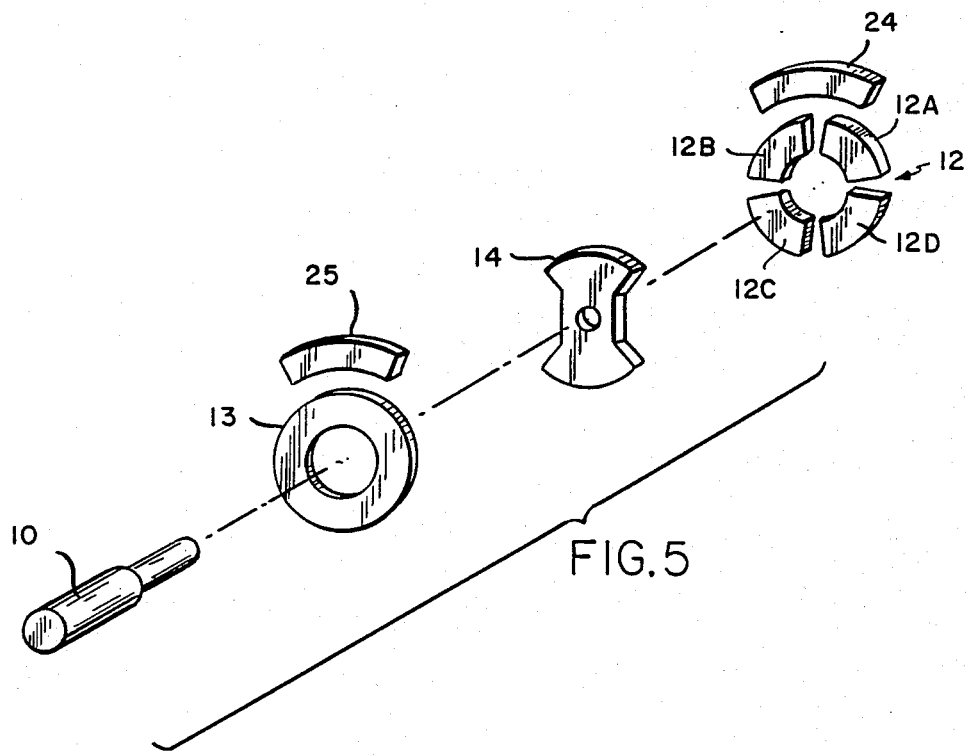
FIG. 5 shows an exploded view of a modification of the embodiment of FIG. 1 for use in the circuitry of FIG. 4.

The capacitor Cr can be physically used in the structure of the system as shown in FIG. 5 in which a first capacitance arcuate plate member 24 is positioned adjacent to segment elements 12A and 12B, as shown, and a corresponding second capacitance arcuate plate member 25 is positioned adjacent to a corresponding portion of ring member 13, as shown. Such plates and the air dielectric therebetween form the capacitance Cr, which is appropriately connected to the oscillator as shown in FIG. 4. The capacitance Cr does not vary in value as a function of the movement of dielectric member 14, since its elements are placed outside the peripheries of such moving dielectric member and of the plate members 12 and 13.

The compensation circuit of FIG. 4 will not only compensate for changes in the oscillator voltage output as a function of temperature, but also compensate for other higher order effects. For example, the operation of the circuit of FIG. 3 may change due to small changes due to temperature changes in the distance between the capacitance plates of the elements 12 and 13, as well as of elements 24 and 25. Such changes in the capacitance Cr are representative of the change thereby occurring in Ca and Cb and the circuit compensates therefor. Further, the temperature compensation circuit would also compensate for other higher order effects, such as may occur due to stray capacitances which exist in the overall circuitry.

In a particular embodiment of the invention, for example, the oscillator may be selected to provide a frequency of about 2.0 MegaHertz at a peak-to-peak AC voltage of about 150 volts. The capacitances Ca, Cb and Cr can be selected in the order of magnitude of about 1 picofarad. The invention is not limited to such specific values, however, and other values may be suitably selected by a designer for a particular application in which the sensor is to be used.

Further, while four capacitances are used in the preferred embodiment of the invention described above, the system concept may be extended to use more than four capacitances, e.g. eight capacitances or even sixteen capacitances, appropriate circuitry being used to provide the desired output voltage changes as a function of the rotary position of the shaft.

Accordingly, while the invention is particularly described above with reference to the preferred embodiments thereof, other modifications thereto may occur to those in the art within the spirit and scope of the invention and, hence, the invention is not to be construed as limited to the particular embodiments depicted, except as defined by the appended claims.

What is claimed is:

1. A detection system for determining the angular position of a rotating element, said system comprising at least two capacitance means including a first capacitance plate member comprising at least four arcuate segments enclosing said rotating element;

a second capacitive plate ring member enclosing said rotating element and displaced from said first capacitive plate member along the length of said rotating element;

a dielectric member fixedly mounted on said rotating element between said first and second capacitive plate members so as to form at least a first capacitance having a capacitance value Ca and at least a second capacitance having a capacitance value Cb, said capacitance values varying oppositely, one increasing and the other decreasing as said rotating element rotates; and measurement circuit means including at least said first and second capacitances and output circuit means responsive at least to the difference between said first and second capacitance values to provide an output representing the angular position of said rotating element.

2. A detection system in accordance with claim 1 wherein said first capacitive plate member comprises four arcuate segments;

said dielectric member includes a pair of oppositely disposed area so as to form with said first capacitor plate member and said second capacitor plate ring member, a first pair of oppositely disposed capacitors C1 and C3, respectively, and a second pair of oppositely disposed capacitors C2 and C4, respectively; and said measurement means includes said first and second pairs of oppositely disposed capacitors and said output circuit means is responsive to the difference in the capacitance values Ca and Cb, where Ca=C1+C3 and Cb=C2+C4.

3. A detection system in accordance with claim 2 wherein said output circuit means includes means for providing currents Ia and Id proportional to the capacitance values Ca and Cb, respectively; and means responsive to the difference between the values of said currents for providing an output representing said angular position.

4. A detection system in accordance with claim 3 wherein the last-named means is a differential current to voltage converter amplifier for providing a voltage output which represents the angular position of said rotating element.

5. A detection system in accordance with claims 1, 2, 3, or 4, and further including compensation means for compensating for changes in the operation of said detection system due to changes in temperature.

6. A detection system in accordance with claim 5 wherein said compensation means includes further capacitance means enclosing said rotating element and positioned outside the capacitive plate members and dielectric member of said at least two capacitances; and compensation circuit means including said further capacitance means and responsive to changes in the capacitance value thereof for compensating for said changes in operation.

7. A detection system in accordance with claim 6 wherein said measurement circuit means includes oscillator circuit means for providing an oscillating voltage for said at least capacitance means and further wherein said compensation circuit means includes said further capacitance means responsive to said oscillating voltage and control circuit means for providing a compensating output for controlling the value of said oscillating voltage.

8. A detection system in accordance with claim 7 wherein said oscillator circuit means is a voltage controlled oscillator and said oscillator circuit means provides a compensating voltage output for controlling the value of the oscillating voltage of said voltage controlled oscillator.

9. A detection system in accordance with claims 1 wherein said rotating element is a rotating shaft of a motor having a limited angle of rotation.

* * * * *